United States Patent
Leabman

(10) Patent No.: US 9,419,443 B2
(45) Date of Patent: Aug. 16, 2016

(54) TRANSDUCER SOUND ARRANGEMENT FOR POCKET-FORMING

(71) Applicant: Energous Corporation, San Jose, CA (US)

(72) Inventor: Michael A. Leabman, Pleasanton, CA (US)

(73) Assignee: Energous Corporation, San Jose, CA (US)

(*) Notice: Subject to any disclaimer, the term of this patent is extended or adjusted under 35 U.S.C. 154(b) by 359 days.

(21) Appl. No.: 14/277,149

(22) Filed: May 14, 2014

(65) Prior Publication Data

US 2015/0333529 A1  Nov. 19, 2015

(51) Int. Cl.
*H02J 5/00* (2016.01)
*H02J 7/02* (2016.01)
*H02J 17/00* (2006.01)

(52) U.S. Cl.
CPC . *H02J 5/00* (2013.01); *H02J 5/005* (2013.01); *H02J 7/02* (2013.01); *H02J 7/025* (2013.01); *H02J 17/00* (2013.01)

(58) Field of Classification Search
CPC .................................................. H04R 1/1025
USPC ............................................................. 307/104
See application file for complete search history.

(56) References Cited

U.S. PATENT DOCUMENTS

| | | |
|---|---|---|
| 4,360,741 A | 11/1982 | Fitzsimmons et al. |
| 5,712,642 A | 1/1998 | Hulderman |
| 5,936,527 A | 8/1999 | Isaacman et al. |
| 5,982,139 A | 11/1999 | Parise |
| 6,127,799 A | 10/2000 | Krishnan |
| 6,127,942 A | 10/2000 | Welle |
| 6,289,237 B1 | 9/2001 | Mickle et al. |
| 6,615,074 B2 | 9/2003 | Mickle et al. |
| 6,798,716 B1 | 9/2004 | Charych |
| 6,856,291 B2 | 2/2005 | Mickle et al. |
| 6,960,968 B2 | 11/2005 | Odendaal et al. |
| 7,003,350 B2 | 2/2006 | Denker et al. |
| 7,027,311 B2 | 4/2006 | Vanderelli et al. |

(Continued)

FOREIGN PATENT DOCUMENTS

| | | |
|---|---|---|
| EP | 2545635 A2 | 1/2013 |
| KR | 1020130026977 A | 3/2013 |

(Continued)

OTHER PUBLICATIONS

International Search Report dated Sep. 15, 2014 corresponding to International Patent Application No. PCT/US2014/037170, 4 pages.

(Continued)

*Primary Examiner* — Robert Deberadinis
(74) *Attorney, Agent, or Firm* — Eric L. Sophir; Dentons US LLP

(57) ABSTRACT

The present disclosure describes a plurality of transducer arrangements that may be suitable for wireless power transmission based on single or multiple pocket-forming. Single or multiple pocket-forming may include one transmitter and at least one or more receivers, being the transmitter the source of energy and the receiver the device that is desired to charge or power. The transducer arrangements may vary in size and geometry, and may operate as a single array, pair array, quad arrays or any other suitable arrangement, which may be designed in accordance with the desired application.

20 Claims, 4 Drawing Sheets

(56) References Cited

U.S. PATENT DOCUMENTS

| | | |
|---|---|---|
| 7,068,991 B2 | 6/2006 | Parise |
| 7,191,013 B1 | 3/2007 | Miranda et al. |
| 7,403,803 B2 | 7/2008 | Mickle et al. |
| 7,451,839 B2 | 11/2008 | Perlman |
| 7,639,994 B2 | 12/2009 | Greene et al. |
| 7,643,312 B2 | 1/2010 | Vanderelli et al. |
| 7,786,419 B2 | 8/2010 | Hyde et al. |
| 7,812,771 B2 | 10/2010 | Greene et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,925,308 B2 | 4/2011 | Greene et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,380,255 B2 | 2/2013 | Shearer et al. |
| 8,410,953 B2 | 4/2013 | Zeine |
| 8,432,062 B2 | 4/2013 | Greene et al. |
| 8,446,248 B2 | 5/2013 | Zeine |
| 8,447,234 B2 | 5/2013 | Cook et al. |
| 8,461,817 B2 | 6/2013 | Martin et al. |
| 8,558,661 B2 | 10/2013 | Zeine |
| 8,621,245 B2 | 12/2013 | Shearer et al. |
| 8,854,176 B2 | 10/2014 | Zeine |
| 8,897,770 B1 | 11/2014 | Frolov et al. |
| 9,000,616 B2 | 4/2015 | Greene et al. |
| 9,021,277 B2 | 4/2015 | Shearer et al. |
| 9,124,125 B2 | 9/2015 | Leabman et al. |
| 2005/0007276 A1 | 1/2005 | Barrick et al. |
| 2006/0238365 A1 | 10/2006 | Vecchione et al. |
| 2006/0284593 A1 | 12/2006 | Nagy et al. |
| 2007/0007821 A1 | 1/2007 | Rossetti |
| 2007/0060185 A1 | 3/2007 | Simon et al. |
| 2007/0178945 A1 | 8/2007 | Cook et al. |
| 2007/0191075 A1 | 8/2007 | Greene et al. |
| 2008/0309452 A1 | 12/2008 | Zeine |
| 2009/0200985 A1 | 8/2009 | Zane et al. |
| 2009/0243397 A1 | 10/2009 | Cook et al. |
| 2010/0027379 A1 | 2/2010 | Saulnier et al. |
| 2010/0033021 A1 | 2/2010 | Bennett |
| 2010/0194206 A1 | 8/2010 | Burdo et al. |
| 2010/0201201 A1 | 8/2010 | Mobarhan et al. |
| 2010/0244576 A1 | 9/2010 | Hillan et al. |
| 2010/0295372 A1 | 11/2010 | Hyde et al. |
| 2010/0309079 A1 | 12/2010 | Rofougaran et al. |
| 2010/0315045 A1 | 12/2010 | Zeine |
| 2011/0074342 A1 | 3/2011 | MacLaughlin |
| 2011/0115303 A1 | 5/2011 | Baarman et al. |
| 2011/0181120 A1 | 7/2011 | Liu et al. |
| 2011/0254503 A1 | 10/2011 | Widmer et al. |
| 2011/0278941 A1 | 11/2011 | Krishna et al. |
| 2011/0281535 A1 | 11/2011 | Low et al. |
| 2011/0282415 A1 | 11/2011 | Eckhoff et al. |
| 2012/0080957 A1 | 4/2012 | Cooper et al. |
| 2012/0146576 A1 | 6/2012 | Partovi |
| 2012/0157019 A1 | 6/2012 | Li |
| 2012/0193999 A1 | 8/2012 | Zeine |
| 2012/0248891 A1 | 10/2012 | Drennen |
| 2012/0274154 A1 | 11/2012 | DeLuca |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0326660 A1 | 12/2012 | Lu et al. |
| 2013/0024059 A1 | 1/2013 | Miller et al. |
| 2013/0026982 A1 | 1/2013 | Rothenbaum |
| 2013/0207604 A1 | 8/2013 | Zeine |
| 2013/0241468 A1 | 9/2013 | Moshfeghi |
| 2013/0241474 A1 | 9/2013 | Moshfeghi |
| 2014/0008992 A1 | 1/2014 | Leabman |
| 2014/0008993 A1 | 1/2014 | Leabman |
| 2014/0035524 A1 | 2/2014 | Zeine |
| 2014/0049422 A1 | 2/2014 | Von Novak et al. |
| 2014/0062395 A1 | 3/2014 | Kwon et al. |
| 2014/0217967 A1 | 8/2014 | Zeine et al. |
| 2014/0241231 A1 | 8/2014 | Zeine |
| 2014/0265725 A1 | 9/2014 | Angle et al. |
| 2014/0265727 A1 | 9/2014 | Berte |
| 2014/0265943 A1 | 9/2014 | Angle et al. |
| 2014/0281655 A1 | 9/2014 | Angle et al. |
| 2014/0354063 A1 | 12/2014 | Leabman et al. |
| 2014/0354221 A1 | 12/2014 | Leabman et al. |
| 2014/0368048 A1 | 12/2014 | Leabman et al. |
| 2014/0375255 A1 | 12/2014 | Leabman et al. |
| 2015/0015194 A1 | 1/2015 | Leabman et al. |
| 2015/0015195 A1 | 1/2015 | Leabman et al. |
| 2015/0022010 A1 | 1/2015 | Leabman et al. |
| 2015/0102681 A1 | 4/2015 | Leabman et al. |
| 2015/0102769 A1 | 4/2015 | Leabman et al. |
| 2015/0130285 A1 | 5/2015 | Leabman et al. |
| 2015/0199665 A1 | 7/2015 | Chu |

FOREIGN PATENT DOCUMENTS

| | | |
|---|---|---|
| WO | 9952173 A2 | 10/1999 |
| WO | 2003091943 A1 | 11/2003 |
| WO | 2004077550 A1 | 9/2004 |
| WO | 2008156571 A2 | 12/2008 |
| WO | WO2010022181 A1 | 2/2010 |
| WO | 2011112022 A2 | 9/2011 |
| WO | 2013035190 A1 | 3/2013 |

OTHER PUBLICATIONS

International Search Report dated Oct. 16, 2014 corresponding to International Patent Application No. PCT/US2014/041546, 4 pages.
International Search Report dated Oct. 13, 2014 corresponding to International Patent Application No. PCT/US2014/041534, 4 pages.
International Search Report dated Nov. 12, 2014 corresponding to International Patent Application No. PCT/US2014/046956, 4 pages.
Written Opinion of the International Searching Authority dated Nov. 12, 2014 corresponding to International Patent Application No. PCT/US2014/046956, 6 pages.
International Search Report dated Sep. 12, 2014 corresponding to International Patent Application No. PCT/US2014/037072, 3 pages.

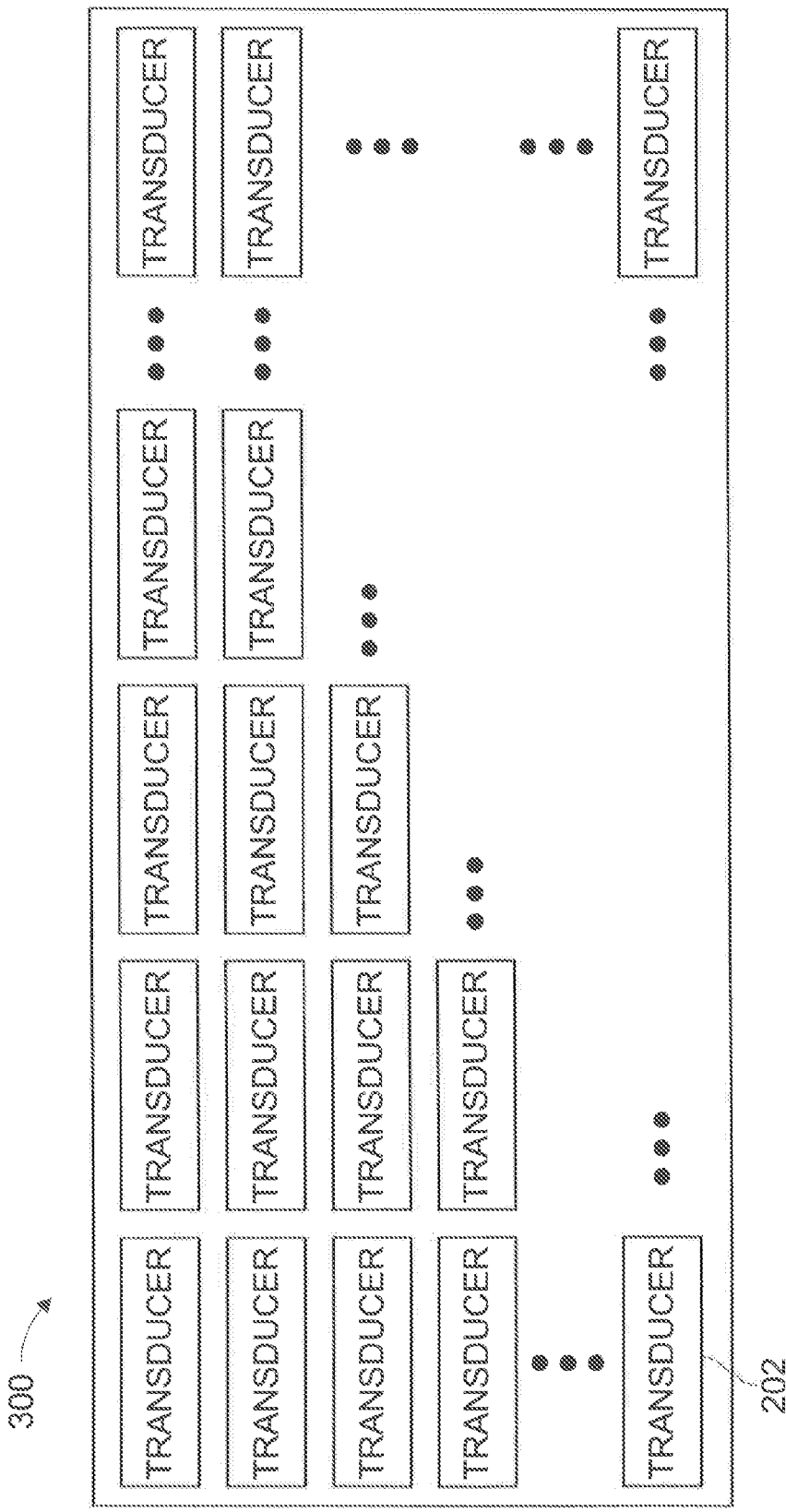

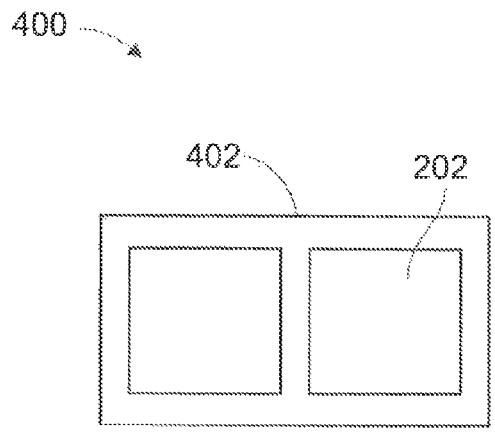
FIG. 4A
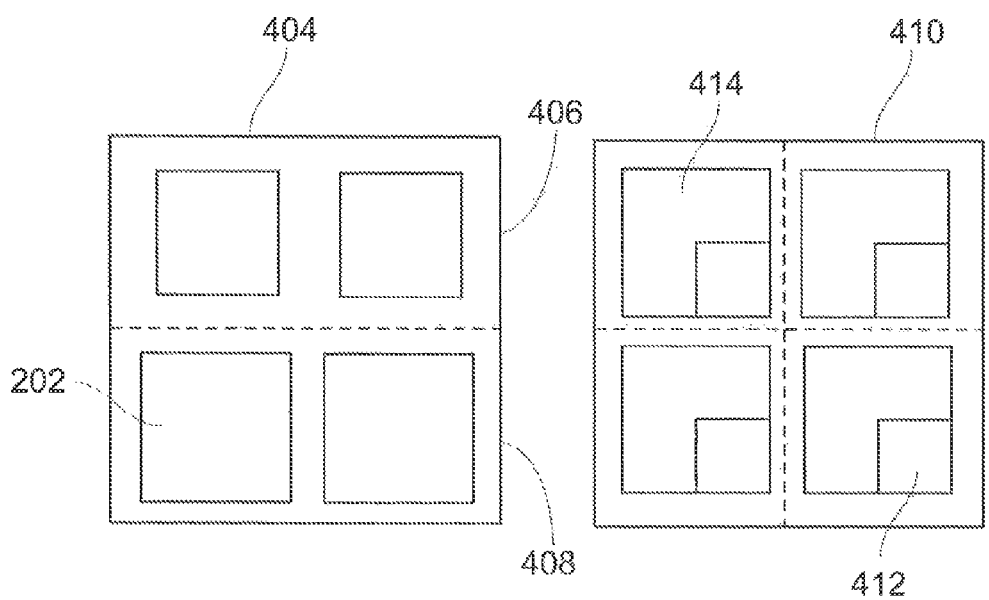
FIG. 4B
FIG. 4C

TRANSDUCER SOUND ARRANGEMENT FOR POCKET-FORMING

CROSS-REFERENCES TO RELATED APPLICATIONS

The present disclosure is related to U.S. Non-Provisional patent application Ser. No. 13/891,399, filed May 10, 2013, entitled "Receivers for Wireless Power Transmission"; Ser. No. 13/891,430, filed on May 10, 2013, entitled "Methodology for Pocket Forming" and Ser. No. 13/891,445, filed May 10, 2013, entitled "Transmitters for Wireless Power Transmission", the entire contents of which are incorporated herein by these references.

FIELD OF INVENTION

The present disclosure relates to wireless sound power transmission, and more particularly to the transducer arrangements for wireless power transmission based on pocket-forming.

BACKGROUND OF THE INVENTION

Portable electronic devices such as smart phones, tablets, notebooks and others, have become an everyday need in the way we communicate and interact with others. The frequent use of these devices may require as significant amount of power, which may easily deplete the batteries attached to these devices. Therefore, a user is frequently needed to plug in the device to a power source, and recharge such device. This may be inconvenient and troublesome if the user forgets to plug in or otherwise charge a device, the device may run out of power and be of no use to the user until the user is again able to charge the device.

There are many approaches in the literature that have tried to reduce the impact of the changing needs of portable electronic devices. In some cases the devices have rechargeable batteries. However, the aforementioned approach requires a user to carry around extra batteries, and also make sure that the extra set of batteries is charged. Solar-powered battery chargers are also known, however, solar cells are expensive, and a large array of solar cells may be required to charge a battery of any significant capacity. Other approaches involve a mat or pad that allows to charge a device without physically connecting a plug of the device, by using electromagnetic signals. In this case, the device still requires to be placed in a certain location for a period of time in order to be charged. Assuming a single source power transmission of a sound wave (SW) at lower frequencies travels further in air. Thus, the received power at a large distance from the sound transmitter is typically larger than the power received from radio frequency (RF) powered transmitter that decreases over longer distances.

However, to increase the power of the received sound signal, the transmission power is typically boosted. Assuming that the transmitted signal has an efficient reception at three centimeters from the SW transmitter, receiving the same signal power over a useful distance of three meters would entail boosting the transmitted power by 10,000×. Such power transmission is wasteful, as most of the energy would be transmitted and not received by the intended devices, it could be hazardous to living tissue, it would most likely interfere with most electronic devices in the immediate vicinity, and it may be dissipated as heat. However, a transducer such as a piezo electric device in the transmitter is capable of sending out a power sound wave at a lower frequency to excite the sensor of a receiver at greater distances to charge and electronic device without the same bad effects of increasing the power emission of a SW transmitter.

In yet another approach such as directional power transmission, it would generally require knowing the location of the device to be able to point the signal in the right direction to enhance the power transmission efficiency. However, even when the device is located, efficient transmission is not guaranteed due to reflections and interference of objects in the path or vicinity of the receiving device. Sound waves however offer several ways to enhance the power transmission that overcomes the problems with SW transmitters.

Therefore, a wireless sound power transmission method solving the aforementioned problems is desired.

SUMMARY OF THE INVENTION

The present disclosure provides a plurality of transducer arrangements that may be suitable for the formation of a single or multiple pockets of energy onto one or more devices. Pockets of energy may be formed by using at least one transmitter and one or more receivers. In one or more aspects of the present disclosure, the transmitter may include a housing having at least two transducer elements, at least one sound wave integrated circuit (SWIC), and at least one digital signal processor or micro-controller which may be connected to a power source. The transmitter housing also includes a communications component for communicating with the receiver.

In another aspect of the present disclosure, the transmitter may include a flat panel transducer array having a N number of transducer elements; where gain requirements for power transmitting may be from multiple transducer elements distributed in an equally spaced grid. However, the number and type of transducer elements may vary in relation with the desired range and power transmission capability on transmitter, the more transducer elements, generally the wider range and higher power transmission capability. Suitable transducer elements may be flat transducer element such as ceramic piezo electric transducers among others. Alternate configurations may also be possible including circular patterns or polygon arrangements.

In yet another aspect of the present disclosure, the transducer elements may operate in single array, pair array, quad array and any other suitable arrangement, which may be designed in accordance with the desired application. In one embodiment, a single array may operate only in one frequency band such as 50 KHz. In another embodiment, a pair array may be divided so as to use ½ of the transducer elements to operate at one frequency and the other ½ to operate at another frequency. These frequencies may alternate one another among 10 KHz to 50 KHz. as these frequency bands are desired to operate and charge electronic devices. In yet another embodiment, a quad array may have 4 transducer elements. In the quad array, each transducer element is configured to virtually operate at different frequencies. By virtually dividing the transducer elements, power losses during wireless sound power transmission are avoided.

The different transducer arrangements described in the present disclosure may improve the capability and efficiency of the transmitter to provide wireless sound power transmission to one or more devices that may operate at different frequency bands These and other advantages of the present disclosure may be evident to those skilled in the art, or may become evident upon reading the detailed description of the prefer embodiment, as shown in the accompanying drawings.

BRIEF DESCRIPTION OF THE DRAWINGS

Embodiments of the present disclosure are described by way of example with reference to the accompanying figures, which are schematic and may not be drawn to scale. Unless indicated as representing prior art, the figures represent aspects of the present disclosure. The main features and advantages of the present disclosure will be better understood with the following descriptions, claims, and drawings, where:

FIG. 3 is an exemplary illustration of a flat panel transducer array that may be used in a transmitter, as the one described in FIG. 2.

FIGS. 4A-C show transducer arrays, according to various embodiments.

DETAILED DESCRIPTION OF THE DRAWINGS

Figure 1:
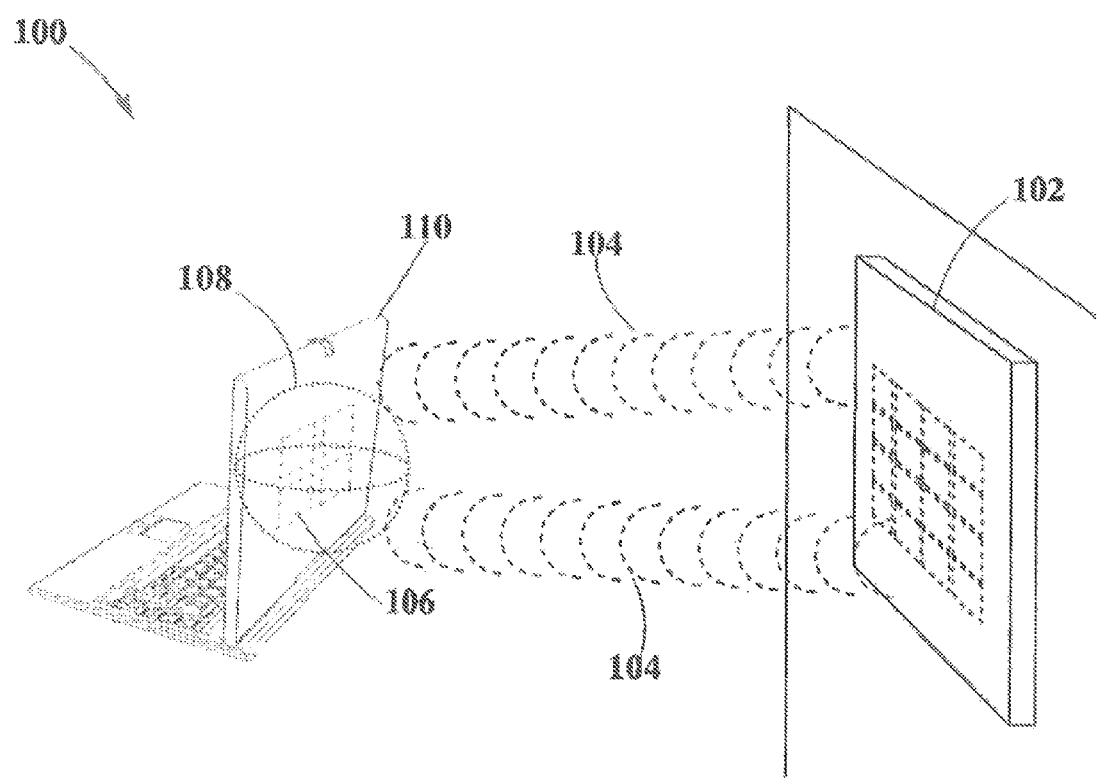
FIG. 1 illustrates a wireless sound power transmission example situation using pocket-forming.

"Pocket-forming" may refer to generating two or more SW waves which converge in 3-d space, forming controlled constructive and destructive interference patterns.

"Pockets of energy" may refer to areas or regions of space where energy or power may accumulate in the form of constructive interference patterns of SW waves.

"Null-space" may refer to areas or regions of space where pockets of energy do not form because of destructive interference patterns of SW waves.

"Transmitter" may refer to a device, including a chip which may generate two or more SW signals, at least one SW signal being phase shifted and gain adjusted with respect to other SW signals, substantially all of which pass through one or more SW antenna such that focused SW signals are directed to a target.

"Receiver" may refer to a device including at least one antenna element, at least one rectifying circuit and at least one power converter, which may utilize pockets of energy for powering, or charging an electronic device.

"Adaptive pocket-forming" may refer to dynamically adjusting pocket-forming to regulate power on one or more targeted receivers.

DESCRIPTION OF THE DRAWINGS

In the following detailed description, reference is made to the accompanying drawings, which form a part hereof. In the drawings, which may not be to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

FIG. 1 illustrates wireless power transmission 100 using pocket-forming. A transmitter 102 may transmit controlled SW waves 104 which may converge in 3-d space. These sound wave frequencies 104 may be controlled through phase and/or relative amplitude adjustments to form constructive and destructive interference patterns (pocket-forming). Pockets of energy 108 may be formed at constructive interference patterns and can be 3-dimensional in shape whereas null-spaces may be generated at destructive interference patterns.

A receiver 106 may then utilize pockets of energy 108 produced by pocket-forming for charging or powering an electronic device, for example a laptop computer 110 and thus effectively providing wireless power transmission. In other situations there can be multiple transmitters 102 and/or multiple receivers 106 for powering various electronic equipment for example smartphones, tablets, music players, toys and others at the same time. In other embodiments, adaptive pocket-forming may be used to regulate power on electronic devices.

Figure 2:
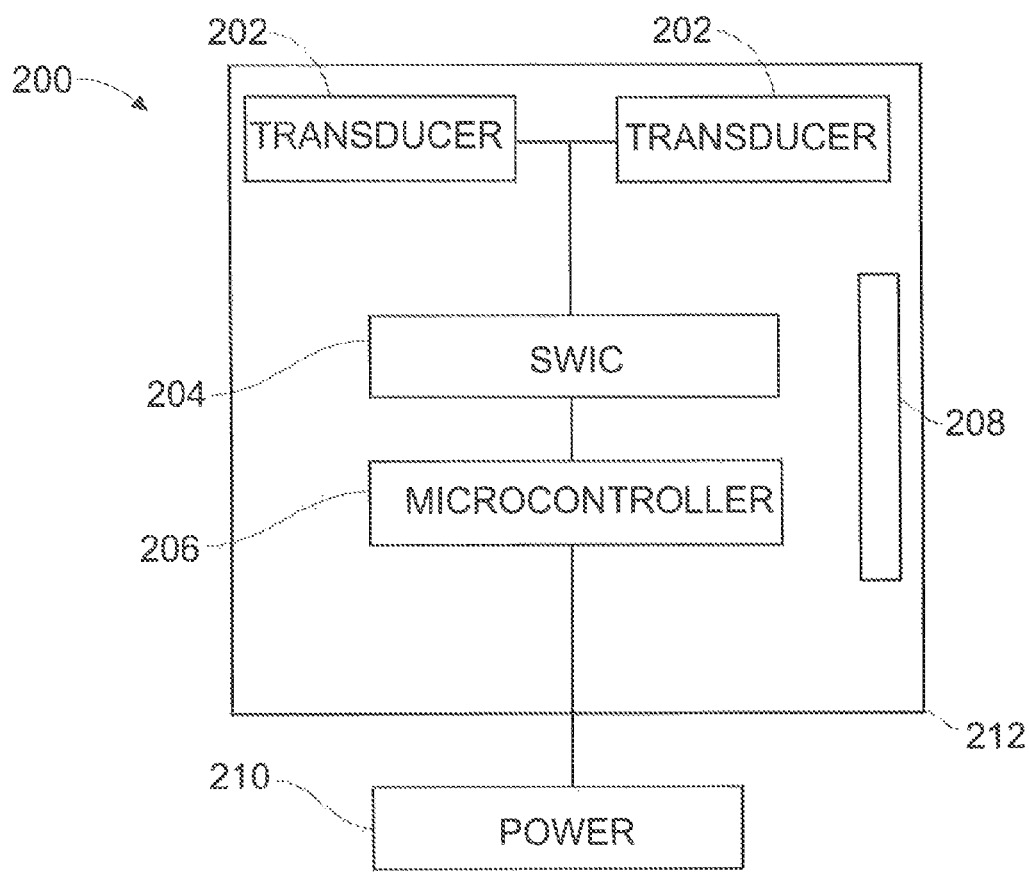
FIG. 2 illustrates a component level embodiment for a transmitter.

FIG. 2 depicts a basic block diagram of a transmitter 200 which may be utilized for wireless power transmission 100. Such transmitter 200 may include one or more antenna elements 202, one or more sound wave integrated circuit (SWIC) 204, one or more microcontroller 206, a communication component 208, a power source 210 and a housing 212, which may allocate all the requested components for transmitter 200. Components in transmitter 200 may be manufactured using meta-materials, micro-printing of circuits, nano-materials, and the like.

Transmitter 200 may be responsible for the pocket-forming, adaptive pocket-forming and multiple pocket-forming through the use of the components mentioned in the foregoing paragraph. Transmitter 200 may send wireless power transmission to one or more receivers in form of radio signals, such signals may include any radio signal with any frequency or wavelength.

FIG. 3 is an exemplary illustration of a flat panel transducer array 300 that may be used in transmitter 200, described in FIG. 2. Flat panel transducer array 300 may then include an N number of transducer elements 202 where gain requirements for power transmitting are multiple transducer elements 202 which may be distributed in an equally spaced grid. In one embodiment, flat panel transducer array 300 may have a 8×8 grid to have a total of 64 transducer elements 202. In another embodiment, flat panel transducer array 300 may have a 16×16 grid to have a total of 256 transducer elements 202. However, the number of transducer elements 202 may vary in relation with the desired range and power transmission capability on transmitter 200, the more transducer elements 202, the wider range and higher power transmission capability. Alternate configurations may also be possible including circular patterns or polygon arrangements.

Flat panel transducer array 300 may also be broken into numerous pieces and distributed across multiple surfaces (multi-faceted).

Transducer elements 202 include flat transducer elements 202. Transducer elements 202 are configured in any suitable arrangement for wireless power transmission. Suitable transducer types may include, for example, a ceramic piezo electric transducer for generating the power sound waves of a lower frequency to travel a larger distance to the receiver. The shape and orientation of transducer elements 202 vary in dependency of the desired features of transmitter 200, orientation may be flat in X, Y, and Z axis, as well as various orientation types and combinations in three dimensional arrangements. Transducer elements 202 materials may include any suitable material that may allow sound signal transmission with high efficiency, lower dissipation of the sound waves and the like.

Transducer elements 202 may include suitable transducer types for operating in frequency bands such as 10 KHz to 50 KHz as these frequency bands conform to a desired frequency to transmit sound waves to the receiver of an electronic device. Transducer elements 202 may operate in independent frequencies, allowing a multichannel operation of pocket-forming.

In addition, transducer elements 202 are selected in a combination of arrangements that varies depending upon the transmitter 200 characteristics. In addition, transducer elements 202 may be located in various surfaces of transmitter 200.

Transducer elements 202 may operate in single array, pair array, quad array and any other suitable arrangement, which may be designed in accordance with the desired application.

FIG. 4 shows transducer arrays 400 according to various embodiments. Transducer arrays 400 may include suitable transducer types for operating in frequency bands such as 10 KHz to 50 KHz, as these frequency bands to comply with the desired sound wave transmission to electronic devices to be charged.

FIG. 4A shows a single array 402 where all transducer elements 202 may operate at 50 KHz for example. Thus single array 402 may be used for charging or powering a single device, similar to the embodiment described in FIG. 1. FIG. 4B shows pair array 404, where the top half 406 of transducer elements 202 may operate at 5.8 Ghz and the bottom half 408 may operate at 2.4 Ghz. Pair array 404 may then be used to charge or power, at the same time, two receivers 106 that may operate at different frequency bands such as the ones described above. As seen in FIG. 4B, transducer elements 202 may vary in size according to the transducer type.

FIG. 4C shows a quad array 410 where each transducer element 202 may be virtually divided to avoid power losses during wireless power transmission. In this embodiment, each transducer element 202 may be virtually divided in two transducer elements 202, transducer element 412 and transducer element 414. Transducer element 412 may be used for transmitting in 50 KHz frequency band and transducer element 414 may be used for transmitting in 10 KHz frequency band. Quad array 410 may then be used in situations where multiple receivers 106 operating at different frequency bands require to be charged or powered.

EXAMPLES

In example #1 a portable electronic device that may operate at 10 KHz may be powered or charged. In this example, a transmitter as the one described in FIG. 2, may be used to deliver pockets of energy onto one electronic device, as in FIG. 1. This transmitter may have a single array of 8×8 of flat panel transducers where all the transducer elements may operate in the frequency band of 10 KHz. Flat transducers may occupy less volume than other transducers, hence allowing a transmitter to be located at small and thin spaces, such as, walls, mirrors, doors, ceilings and the like. In addition, flat panel transducers may be optimized for operating to long distances into narrow hall of wireless power transmission, such feature may allow operation of portable devices in long areas such as, train stations, bus stations, airports and the like. Furthermore, flat panel transducers of 8×8 may generate smaller pockets of energy than other transducers since its smaller volume, this may reduce losses and may allow more accurate generation of pockets of energy, such accuracy may be employed for charging/powering a variety of portable electronic devices near areas and/or objects which do not require pockets of energy near or over them.

In example #2 two electronic devices that may operate at two different frequency bands may be powered or charged at the same time. In this example, the transmitter as the one described in FIG. 2, may be used to deliver pockets of energy onto two electronic devices. In this example, the transmitter may have a pair array with different type of transducers, flat panel transducers where the array may be formed by flat panel transducers and the other transducers configurations, as shown in FIG. 4b. As described in example #1, flat panel transducers may be optimized to radiate power sound waves within narrow halls at considerable distances. On the other hand, transducers are employed for propagate sound power waves at nearer distances but covering more area because of their propagation pattern. Furthermore, transducers may be manually adjusted, this feature may be beneficial when the transmitter is located at crowded spaces and sound transmission needs to be optimized.

Having thus described the invention, I claim:

1. A method for transmitting wireless power, comprising:
generating two or more SW waves from a transmitter with at least two SW transmit transducers;
forming controlled constructive interference patterns from the generated SW waves by a sound wave integrated circuit controlled by a microcontroller;
accumulating energy or power in the form of constructive interference patterns from the SW waves to form pockets of energy;
converging the pockets of energy in 3-d space to a targeted electronic device;
arranging the transducers in an array optimal for charging or operating the targeted electronic device with the pockets of energy.

2. The method for transmitting wireless power of claim 1, further the method of forming controlled destructive interference patterns from the generated SW waves and accumulating energy or power in the form of destructive interference patterns from the SW waves to form null-spaces of energy and including a plurality of transducer array arrangements suitable for the formation of a single or multiple pockets of energy transmitted to one or more targeted electronic devices.

3. The method for transmitting wireless power of claim 1, further including a flat panel transducer array having a N number of transducers where gain requirements for power transmitting range from 64 to 256 transducers distributed in an equally spaced grid for enhancing reception of the pockets of energy by the electronic device.

4. The method for transmitting wireless power of claim 3, wherein the number and type of transducers varies in relationship to a predetermined desired range and power transmission capability of the transmitter whereby the greater the N number of transducers results in a wider range and a higher power delivery of pockets of energy to the targeted electronic device.

5. The method for transmitting wireless power of claim 1, wherein the transducers are flat transducers or any other transducers configured for transmission of pockets of energy.

6. A system for transmitting wireless power, comprising:
a transmitter having two SW transducers in an array for generating pockets of energy;
a receiver electrically connected to at least one electronic device for receiving the pockets of energy;
a micro-controller connected to a power source for controlling the generated pockets of energy delivered to the electronic device from a predetermined array of transducers for propagating the sound waves for reception by a receiver connected to an electronic device to be charged.

7. The system for transmitting wireless power of claim 6, wherein the transmitter generating two or more SW waves from at least two SW transmit transducers creates constructive interference patterns from the SW waves to form predetermined pockets of energy under the direction of the microcontroller.

8. The system for transmitting wireless power of claim 6, wherein the receiver includes at least one transducer for receiving the pockets of energy for charging or operating the electronic device.

9. The system for transmitting wireless power of claim 8, wherein the generated pockets of energy are received by a plurality of electronic devices at a higher efficiency due to transducer array orientation on the transmitter and receiver directed by the micro-controller in response to a communication signal from the receiver.

10. The system for transmitting wireless power of claim 6, further including a sound wave frequency integrated circuit driven by a predetermined program in the micro-controller for pocket-forming to charge or operate the electronic device through an transducer array including a N number of transducer elements in the range of 64 to 256 transducer elements distributed in an equally spaced grid on the transmitter.

11. A system for transmitting wireless power, comprising:
a transmitter for generating two or more SW waves having at least two SW transmit transducers to form controlled constructive interference patterns from the generated SW waves;
a micro-controller within the transmitter controlling the constructive interference patterns of generated SW waves for pocket-forming to accumulate pockets of energy in predetermined areas or regions in space;
a receiver with at least one transducer to receive the accumulated pockets of energy converging in 3-d space to a targeted electronic device;
a communication network connected to transmitter and receiver for determining the areas or regions in space to receive the pockets of energy from the transmitter through an array of transducers for charging or operating the targeted electronic device.

12. The system for transmitting wireless power of claim 11, wherein the transmitter generates SW waves to form controlled destructive interference patterns that form null-spaces without pockets of energy, and wherein the array of transducers is a 8×8 grid having a total of 64 transducer elements distributed in an equally spaced grid.

13. The system for transmitting wireless power of claim 11, wherein the array of transducers is a 16×16 having a total of 256 transducer elements distributed in an equally spaced grid.

14. The system for transmitting wireless power of claim 11, wherein the number of transducers varies depending upon the predetermined range and power transmission.

15. The system for transmitting wireless power of claim 11, wherein the transducers arrangement includes circular patterns or polygon configurations for charging or operating a plurality of electronic devices.

16. The system for transmitting wireless power of claim 11, wherein the transducers operate in frequency bands of 10 KHz to 50 KHz.

17. The system for transmitting wireless power of claim 11, wherein the transducers are configured in a combination that enhances the propagation of power sound waves in the pocket-forming process.

18. The system for transmitting wireless power of claim 11, wherein the transducers operate in a single array, pair array, quad array or any other suitable array arrangement for transmission of pockets of energy and the propagation of sound waves in air.

19. The system for transmitting wireless power of claim 11, wherein the transducers are arranged in a pair array where the top half of the transducer operate a 50 KHz and the bottom half of the array operates at 10 KHz driven by the transmitter controlled by the micro-controller.

20. The system for transmitting wireless power of claim 11, wherein the micro-controller dynamically adjusts the pocket-forming through a predetermined transducer array to regulate power on one or more targeted electronic devices.

* * * * *